US012582902B2

(12) United States Patent
Miller et al.

(10) Patent No.: US 12,582,902 B2
(45) Date of Patent: Mar. 24, 2026

(54) COMPACT HEAD-MOUNTED AUGMENTED REALITY SYSTEM

(71) Applicant: Niantic Spatial, Inc., San Francisco, CA (US)

(72) Inventors: Michael Miller, London (GB); Maryam Sabour, Toronto (CA); Austin Shan Drin Young, San Mateo, CA (US); Philip Antony Rutledge, Dallas, TX (US); Uday Kishore Pasupuleti, Dublin, CA (US); Christopher Grant Stoski, San Rafael, CA (US); Dean Lester, Redmond, WA (US); Gadi Amit, San Mateo, CA (US); Quinn Jerome Odette Fitzgerald, San Francisco, CA (US); Scott Timothy Alberstein, San Francisco, CA (US); Elliot Waugh Raderman, San Francisco, CA (US)

(73) Assignee: Niantic Spatial, Inc., San Francisco, CA (US)

( * ) Notice: Subject to any disclaimer, the term of this patent is extended or adjusted under 35 U.S.C. 154(b) by 186 days.

(21) Appl. No.: 18/215,496

(22) Filed: Jun. 28, 2023

(65) Prior Publication Data

US 2023/0415033 A1      Dec. 28, 2023

Related U.S. Application Data

(60) Provisional application No. 63/356,472, filed on Jun. 28, 2022.

(51) Int. Cl.
*A63F 13/25* (2014.01)
*A63F 13/216* (2014.01)
(Continued)

(52) U.S. Cl.
CPC .............. *A63F 13/25* (2014.09); *A63F 13/65* (2014.09); *G02B 27/0176* (2013.01);
(Continued)

(58) Field of Classification Search
CPC ........ A63F 13/25; A63F 13/65; A63F 13/216; A63F 13/211; A63F 13/212;
(Continued)

(56) References Cited

U.S. PATENT DOCUMENTS

2017/0017085 A1    1/2017   Araki et al.
2017/0092235 A1    3/2017   Osman et al.
(Continued)

OTHER PUBLICATIONS

PCT International Search Report and Written Opinion, PCT Application No. PCT/IB2023/056648, Oct. 12, 2023, 9 pages.

*Primary Examiner* — Peter J Iannuzzi
(74) *Attorney, Agent, or Firm* — Fenwick & West LLP

(57) ABSTRACT

A head-mounted device (HMD) may include a front portion, a rear portion and one or more bands. The front portion may include an optical display configured to output image light to a user's eyes. The rear portion may be arranged with the front portion to balance the HMD in weight. The one or more bands connect the front portion and the rear portion so that the two portions rest on either side of the user's head.

20 Claims, 9 Drawing Sheets

600

Forehead Pad
610

Male Connector
622

Female Connector
624

Tall Forehead Pad
612

Short Forehead Pad
614

(51) Int. Cl.
    *A63F 13/65*         (2014.01)
    *G02B 27/01*       (2006.01)

(52) U.S. Cl.
    CPC .... *A63F 13/216* (2014.09); *G02B 2027/0169*
            (2013.01); *G02B 2027/0178* (2013.01)

(58) Field of Classification Search
    CPC .. A63F 13/213; A63F 13/428; A63F 13/5255;
           G02B 27/0176; G02B 2027/0169; G02B
                             2027/0178
    See application file for complete search history.

(56)                 References Cited

U.S. PATENT DOCUMENTS

| | | | |
|---|---|---|---|
| 2018/0364491 A1* | 12/2018 | Park | G02B 27/0176 |
| 2020/0045842 A1* | 2/2020 | Araki | H05K 5/0221 |
| 2020/0225493 A1* | 7/2020 | Yu | G02B 27/017 |
| 2020/0400948 A1 | 12/2020 | Maric et al. | |
| 2021/0365110 A1 | 11/2021 | Mikhailov et al. | |
| 2024/0103282 A1* | 3/2024 | Law | G02C 5/126 |

* cited by examiner

Server 340

Versatile Compute Puck 320

HMD 310

BT

Gaming Controller 330

BT+CV

Rear portion 420

Front Portion 410

400

Band 430

Forehead Pad 414

Optical Display 412

400

Sensors 416

600

Tall Forehead Pad
612

Short Forehead Pad
614

Forehead Pad
610

Female Connector
624

Male Connector
622

700

Rear portion
720

Bands
730

Front Portion
710

COMPACT HEAD-MOUNTED AUGMENTED REALITY SYSTEM

REFERENCE TO RELATED APPLICATIONS

The application claims the benefit of U.S. Provisional Application No. 63/356,472, filed Jun. 28, 2022, which is incorporated by reference.

TECHNICAL FIELD

The present disclosure relates generally to augmented reality (AR), and, in particular, to compact AR devices.

BACKGROUND

Various AR devices for consumer use-cases have been developed in the last ten to fifteen years. Widespread adoption of compact AR devices has been hindered by challenges in providing a balance of usefulness and socially acceptable form factor. Technological limitations have been a barrier for achieving a desirable level of functionality in conjunction with a form factor that is acceptable to a broad range of users. When trying to fit the components of a useful system in a glasses or headset form factor, the wearable device becomes heavy and large, particularly on the face of the user, which can be both inconvenient and uncomfortable. In contrast, smaller form factor devices that are more convenient and may be considered more socially acceptable have less functionality and the applicative value becomes too low.

SUMMARY

The above and other challenges may be addressed by a compact head-mounted augmented reality (AR) device that has integrated electronic components for providing AR content to the wearer. Various features, aspects, and advantages of the compact AR device may be better understood with reference to the following description. The accompanying drawings illustrate specific embodiments and, together with the description, serve to explain various principles. However, the drawings should not be considered limiting. Rather, the scope of protection should be determined from the claims. The following description focuses on a particular use-case—goggles with AR functionality for outdoor gaming—but the disclosed principles may be applied to other use cases and form factors.

In one aspect, this disclosure provides a head-mounted device (TIMID). The HMD may include a front portion, a rear portion, and one or more bands. The front portion may include an optical display that outputs image light to a user's eyes. The rear portion may be arranged with the front portion to balance the HMD in weight. The one or more bands connect the front portion and the rear portion so that the two portions rest on either side (e.g., the front and back) of the user's head.

In another aspect, the disclosure provides a gaming device. The gaming device may include a head-mounted device (HMD) and a gaming controller. The HMD may include a front portion, a rear portion, and one or more bands. The front portion may include an optical display that outputs image light to a user's eyes. The rear portion may be arranged with the front portion to balance the HMD in weight. The one or more bands connect the front portion and the rear portion so that the two portions rest on either side of the user's head. The gaming controller may receive the user's input and transmit the input to the UMD.

DETAILED DESCRIPTION

Figure 1:
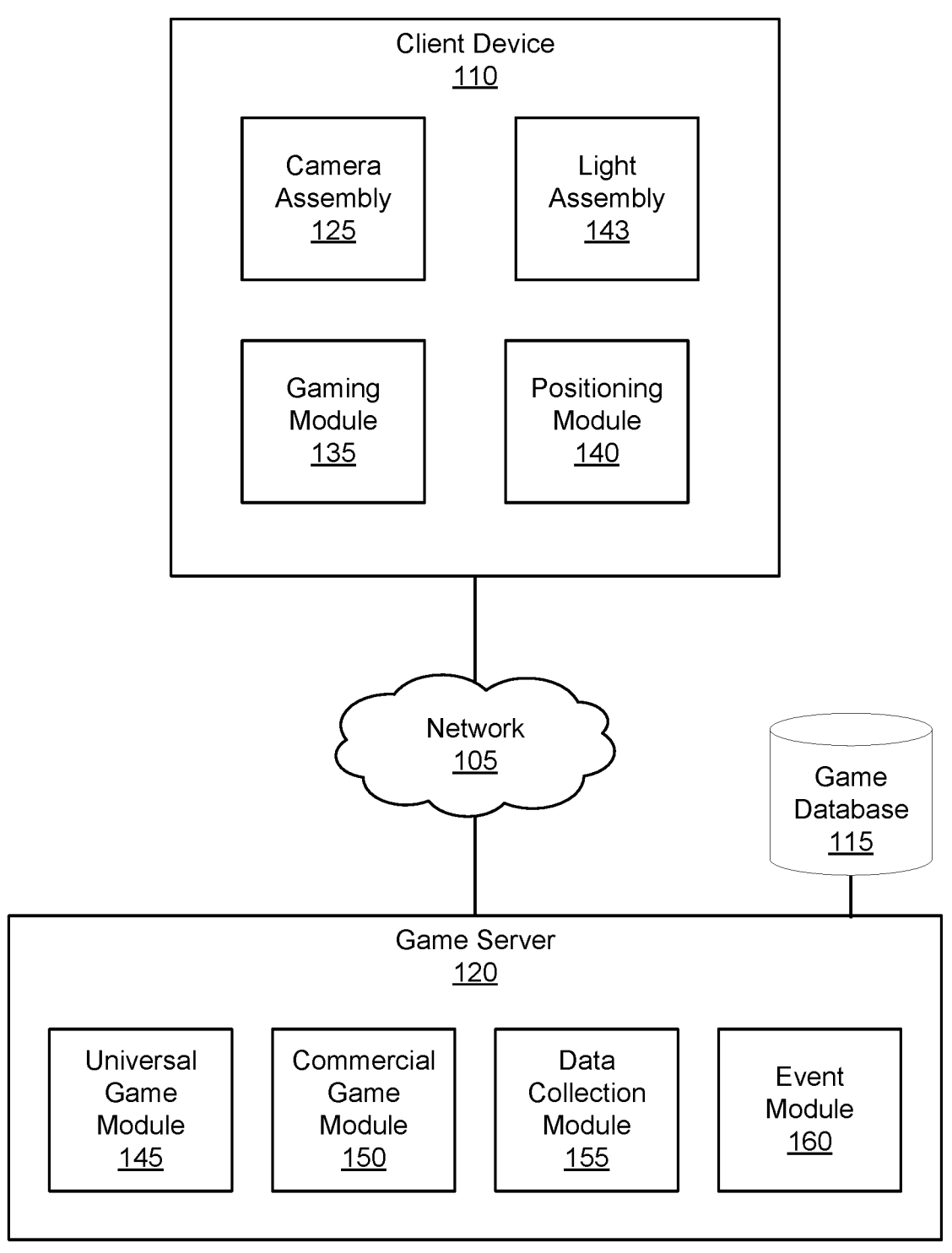
FIG. 1 is a block diagram of a networked computing environment suitable for providing a parallel-reality game with augmented reality elements, according to one embodiment.

Reference now will be made in detail to various embodiments, one or more examples of which are illustrated in the drawings. Each example is provided by way of explanation of the described embodiments, not limitation of the claims. In fact, it will be apparent to those skilled in the art that various modifications and variations can be made without departing from the principles described. For instance, features illustrated or described as part of one embodiment can be used with another embodiment to yield a still further embodiment. Thus, it is intended that the present disclosure covers such modifications and variations as come within the scope of the appended claims and their equivalents.

Described herein are embodiments of a compact AR device having its components separated into two portions: a front portion and a rear portion. The front portion of the AR device is positioned at the front of a user's face during use while the rear position rests at the back of the user's head. The front portion and the rear portion may be connected by a flexible strap such that, when the device is not in use, the front and rear portions can be collapsed together for compact storage. The flexible strap connecting the two portions may additionally be elastic to allow for the AR device to fit a variety of head sizes and shapes with little adjustment. In other embodiments, the compact AR device may have additional portions.

Exemplary Location-Based Parallel Reality Gaming System

In a parallel reality game, a virtual world geography that parallels at least a portion of the real-world geography such that player movement and actions in the real-world affect actions in the virtual world and vice versa. The virtual world may include augmented reality (AR) content that players can view overlaid on images of the real world by traveling to the corresponding real-world locations. Those of ordinary skill in the art, using the disclosures provided herein, will understand that the subject matter described is applicable in other situations where AR images are displayed. Furthermore, those of ordinary skill in the art, using the disclosures provided herein, will appreciate that numerous game interface configurations and underlying functionalities will be apparent in light of this disclosure. The present disclosure is not intended to be limited to any one particular configuration.

FIG. 1 illustrates a networked computing environment 100, in accordance with one or more embodiments. The networked computing environment 100 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 110 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, a player who is close enough to a virtual element to interact with it in this manner is referred to as being at the real-world location corresponding the virtual element. In addition, various embodiments are described with reference to "the player's location" but one of skill in the art will appreciate that such references may refer to the location of the player's client device 110.

Figure 2:
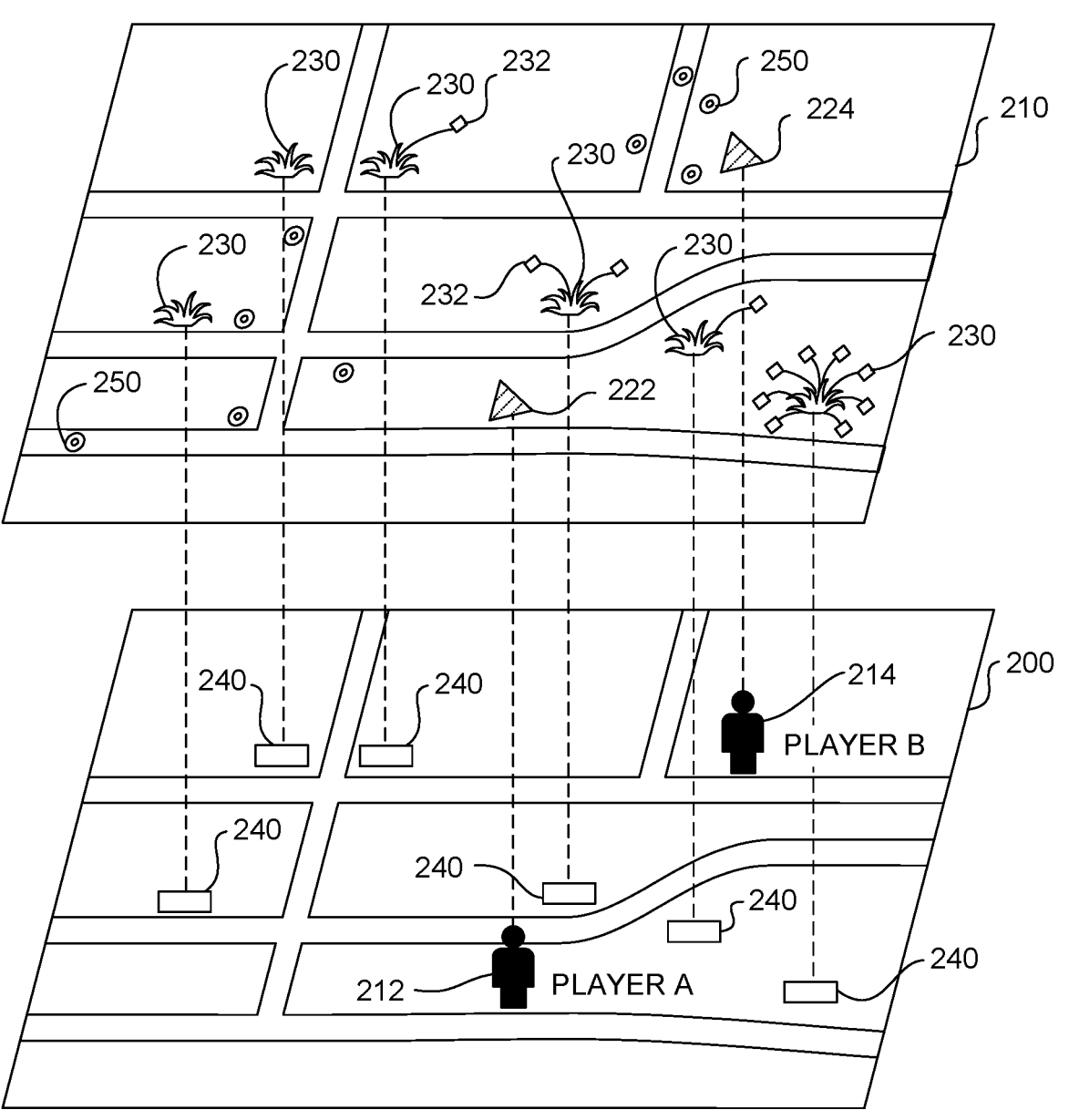
FIG. 2 illustrates correspondence in coordinates between a virtual world and the real world in a parallel reality game, according to one embodiment.

Reference is now made to FIG. 2 which depicts a conceptual diagram of a virtual world 210 that parallels the real world 200 that can act as the game board for players of a parallel reality game, according to one embodiment. As illustrated, the virtual world 210 can include a geography that parallels the geography of the real world 200. In particular, a range of coordinates defining a geographic area or space in the real world 200 is mapped to a corresponding range of coordinates defining a virtual space in the virtual world 210. The range of coordinates in the real world 200 can be associated with a town, neighborhood, city, campus, locale, a country, continent, the entire globe, or other geographic area. Each geographic coordinate in the range of geographic coordinates is mapped to a corresponding coordinate in a virtual space in the virtual world.

A player's position in the virtual world 210 corresponds to the player's position in the real world 200. For instance, the player A located at position 212 in the real world 200 has a corresponding position 222 in the virtual world 210. Similarly, the player B located at position 214 in the real world has a corresponding position 224 in the virtual world. As the players move about in a range of geographic coordinates in the real world, the players also move about in the range of coordinates defining the virtual space in the virtual world 210. In particular, a positioning system (e.g., a GPS system) associated with a mobile computing device carried by the player can be used to track a player's position as the player navigates the range of geographic coordinates in the real world. Data associated with the player's position in the real world 200 is used to update the player's position in the corresponding range of coordinates defining the virtual space in the virtual world 210. In this manner, players can navigate along a continuous track in the range of coordinates defining the virtual space in the virtual world 210 by simply traveling among the corresponding range of geographic coordinates in the real world 200 without having to check in or periodically update location information at specific discrete locations in the real world 200.

The location-based game can include a plurality of game objectives requiring players to travel to or interact with various virtual elements or virtual objects scattered at various virtual locations in the virtual world. Some or all of the virtual objects can be an AR object that is displayed by the client device 110. AR objects can include animate and inanimate objects. Animate objects may be referred to as a virtual character. Virtual characters can represent a character of the game, such as a non-player character (NPC). A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements or objects at the specific location to achieve or perform one or more game objectives.

For example, a game objective has players interacting with virtual elements 230 located at various virtual locations in the virtual world 210. These virtual elements 230 can be linked to landmarks, geographic locations, or objects 240 in the real world 200. The real-world landmarks or objects 240 can be works of art, monuments, buildings, businesses, libraries, museums, or other suitable real-world landmarks or objects. Interactions include capturing, claiming ownership of, using some virtual item, spending some virtual currency, etc. To capture these virtual elements 230, a player travels to the landmark or geographic location 240 linked to the virtual elements 230 in the real world and interacts with the virtual elements 230 in the virtual world 210. For example, player A of FIG. 2 may have to travel to a landmark 240 in the real world 200 in order to interact with or capture a virtual element 230 linked with that particular landmark 240. The interaction with the virtual element 230 can require action in the real world, such as viewing an AR representation of the virtual element overlaid over a view of the real-world location in a set of images (e.g., a video) captured by a camera and taking a "photograph" of the virtual element within the real world. The set of images and the photograph may be captured by a camera mounted on a compact AR device (e.g., AR goggles or visor).

Game objectives may require that players use one or more virtual items that are collected by the players in the location-based game. For instance, the players may travel the virtual world 210 seeking virtual items (e.g. weapons, creatures, power ups, or other items) that can be useful for completing game objectives. These virtual items can be found or collected by traveling to different locations in the real world 200 or by completing various actions in either the virtual world 210 or the real world 200. In the example shown in FIG. 2, a player uses virtual items 232 to capture one or more virtual elements 230. In particular, a player can deploy virtual items 232 at locations in the virtual world 210 proximate or within the virtual elements 230. Deploying one or more virtual items 232 in this manner can result in the capture of the virtual element 230 for the particular player or for the team/faction of the particular player.

In one particular implementation, a player may have to gather virtual energy or other items as part of the parallel reality game. As depicted in FIG. 2, virtual energy 250 can be scattered at different locations in the virtual world 210. A player can collect the virtual energy 250 and other items by traveling to the corresponding locations in the real world 200. The virtual energy 250 can be used to power virtual items or to perform various game objectives in the game. Other items may perform any other suitable function, depending on the game.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real-world locations for cooperative or interactive events in the parallel reality game. In these cases, the game server seeks to ensure players are indeed physically present and not spoofing.

The parallel reality game can have various features to enhance and encourage game play within the parallel reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. In some embodiments, players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the parallel reality game without deviating from the scope of the present disclosure.

Referring back FIG. 1, the networked computing environment 100 uses a client-server architecture, where a game server 120 communicates with a client device 110 over a network 105 to provide a parallel reality game to players at the client device 110. The networked computing environment 100 also may include other external systems such as sponsor/advertiser systems or business systems. Although only one client device 110 is illustrated in FIG. 1, any number of client devices 110 or other external systems may be connected to the game server 120 over the network 105. Furthermore, the networked computing environment 100 may contain different or additional elements and functionality may be distributed between the client device 110 and the server 120 in a different manner than described below.

A client device 110 can be any portable computing device that can be used by a player to interface with the game server 120. For instance, a client device 110 can be a wireless device, a personal digital assistant (PDA), portable gaming device, cellular phone, smart phone, tablet, navigation system, handheld GPS system, wearable computing device, a display having one or more processors, or other such device.

In one embodiment, the functionality described below as performed by the client device 110 is distributed between a mobile computing device such as a tablet or smartphone and a wearable device such as an AR goggles. For example, one or more cameras on an AR goggles worn by a player may capture images of the environment around the player, the player's smartphone may determine the real-world location at which to display one or more AR elements, and one or more displays mounted on the AR goggles may display the AR elements at the determined locations. In another embodiment, the AR goggles provides all of the functionality described below as performed by the client device 110.

In one embodiment, the client device 110 communicates with the game server 120 providing the game server 120 with sensory data of a physical environment. The client device 110 includes a camera assembly 125 that captures image data in two dimensions of a scene in the physical environment where the client device 110 is. In the embodiment shown in FIG. 1, the client device 110 includes additional software components such as a gaming module 135 and a positioning module 140, and a light assembly 143. The client device 110 may include various other input/output devices for receiving information from or providing information to a player. Example input/output devices include a display screen, a touch screen, a touch pad, data entry keys, speakers, and a microphone suitable for voice recognition. The client device 110 may also include other various sensors for recording data from the client device 110 including but not limited to movement sensors, accelerometers, gyroscopes, other inertial measurement units (IMUs), barometers, positioning systems, thermometers, light sensors, etc. The client device 110 can further include a network interface for providing communications over the network 105. A network interface can include any suitable components for interfacing with one more networks, including for example, transmitters, receivers, ports, controllers, antennas, or other suitable components.

The camera assembly 125 captures image data of a scene of the environment in which the client device 110 is located. The camera assembly 125 may utilize a variety of varying photo sensors with varying color capture ranges at varying capture rates. The camera assembly 125 may contain a wide-angle lens or a telephoto lens. The camera assembly 125 may be configured to capture single images or video as the image data. The camera assembly 125 captures image data and shares the image data with the computing device on the client device 110. The image data can be appended with metadata describing other details of the image data including sensory data (e.g., temperature, brightness of environment) or capture data (e.g., exposure, warmth, shutter speed, focal length, capture time, etc.). The camera assembly 125 can include one or more cameras which can capture image data. In one instance, the camera assembly 125 includes a pair of cameras mounted on the left and right sides of an AR goggles that are configured to capture stereo image data from positions that approximate the positions of the wearer's eyes. In another instance, the camera assembly 125 includes a single camera mounted in an approximate center of the front side of the AR goggles. In various other implementations, the camera assembly 125 includes multiple cameras each configured to capture image data.

The gaming module 135 provides a player with an interface to participate in the parallel reality game. The game server 120 transmits game data over the network 105 to the client device 110 for use by the gaming module 135 at the client device 110 to provide local versions of the game to players at locations remote from the game server 120. The game server 120 can include a network interface for providing communications over the network 105. A network interface can include any suitable components for interfacing with one more networks, including for example, transmitters, receivers, ports, controllers, antennas, or other suitable components.

The gaming module 135 executed by the client device 110 provides an interface between a player and the parallel reality game. The gaming module 135 can present a user interface on a display device, such as optical displays mounted on the AR goggles and positioned in front of the wearer's eyes. The user interface may include virtual elements associated with the game and enable a player to interact with the virtual elements to perform various game objectives. The gaming module 135 may generate virtual content or adjust virtual content according to other information received from other components of the client device. For example, the gaming module 135 may adjust a virtual object to be displayed on the user interface according to a depth information of the scene captured in the image data.

The gaming module 135 can also control various other outputs to allow a player to interact with the game. For instance, the gaming module 135 can control various audio, vibratory, or other notifications. The gaming module 135 can access game data received from the game server 120 to provide an accurate representation of the game to the player. The gaming module 135 can receive and process player input and provide updates to the game server 120 over the network 105. The gaming module 135 may also generate or adjust game content to be displayed by the client device 110. For example, the gaming module 135 may generate a virtual element based on information describing traversable space of a scene (e.g., as determined by the traversable space estimation model 130). For example, the gaming module 135 may determine a path for a virtual element in the scene on the traversable space.

The positioning module 140 can be any device or circuitry for monitoring the position of the client device 110. For example, the positioning module 140 can determine actual or relative position by using a satellite navigation positioning system (e.g., a GPS system, a Galileo positioning system, the Global Navigation satellite system (GLONASS), the BeiDou Satellite Navigation and Positioning system), an inertial navigation system, a dead reckoning system, based on IP address, by using triangulation or proximity to cellular towers or Wi-Fi hotspots, or other suitable techniques for determining position. The positioning module 140 may further include various other sensors that may aid in accurately positioning the client device 110 location. For example, the client device 110 may perform localization by comparing images captured by one or more cameras of the client device to a 3D map.

As the player moves around with the client device 110 in the real world, the positioning module 140 tracks the position of the player and provides the player position information to the gaming module 135. The gaming module 135 updates the player position in the virtual world associated with the game based on the actual position of the player in the real world. Thus, a player can interact with the virtual world simply by carrying or transporting the client device 110 in the real world. In particular, the location of the player in the virtual world can correspond to the location of the player in the real world. The gaming module 135 can provide player position information to the game server 120 over the network 105. In response, the game server 120 may enact various techniques to verify the client device 110 location to prevent cheaters from spoofing the client device

110 location. It should be understood that location information associated with a player is utilized only if permission is granted after the player has been notified that location information of the player is to be accessed and how the location information is to be utilized in the context of the game (e.g., to update player position in the virtual world). In addition, any location information associated with players will be stored and maintained in a manner to protect player privacy.

The light assembly 143 includes one or more lights that may illuminate the environment around the client device. In one embodiment, the light assembly 143 includes a flash associated with the camera assembly 125. The flash may briefly light up to aid in the capturing of a single photograph or may light for an extended period of time to act as a flashlight. In other embodiments, the light assembly 143 may include different types of light, such as an infrared light to illuminate objects and enable images to be captured of a scene by an infrared camera without illuminating the scene with visible light.

The game server 120 can be any computing device and can include one or more processors and one or more computer-readable storage media. The computer-readable storage media can store instructions which cause the processor to perform operations. The game server 120 can include or can be in communication with a game database 115. The game database 115 stores game data used in the parallel reality game to be served or provided to the client(s) 110 over the network 105.

The game data stored in the game database 115 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated with virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real-world objects, landmarks, positions linked to virtual world elements (e.g. location of real-world objects/landmarks, description of real-world objects/landmarks, relevance of virtual elements linked to real-world objects, etc.); (6) game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the parallel reality game. The game data stored in the game database 115 can be populated either offline or in real time by system administrators or by data received from users/players of the system 100, such as from a client device 110 over the network 105.

The game server 120 can be configured to receive requests for game data from a client device 110 (for instance via remote procedure calls (RPCs)) and to respond to those requests via the network 105. For instance, the game server 120 can encode game data in one or more data files and provide the data files to the client device 110. In addition, the game server 120 can be configured to receive game data (e.g. player positions, player actions, player input, etc.) from a client device 110 via the network 105. For instance, the client device 110 can be configured to periodically send player input and other updates to the game server 120, which the game server 120 uses to update game data in the game database 115 to reflect any and all changed conditions for the game.

In the embodiment shown, the server 120 includes a universal gaming module 145, a commercial game module 150, a data collection module 155, an event module 160, and a traversable space estimation training system 170. As mentioned above, the game server 120 interacts with a game database 115 that may be part of the game server 120 or accessed remotely (e.g., the game database 115 may be a distributed database accessed via the network 105). In other embodiments, the game server 120 contains different or additional elements. In addition, the functions may be distributed among the elements in a different manner than described. For instance, the game database 115 can be integrated into the game server 120.

The universal game module 145 hosts the parallel reality game for all players and acts as the authoritative source for the current status of the parallel reality game for all players. As the host, the universal game module 145 generates game content for presentation to players, e.g., via their respective client devices 110. The universal game module 145 may access the game database 115 to retrieve or store game data when hosting the parallel reality game. The universal game module 145 also receives game data from client device 110 (e.g. depth information, player input, player position, player actions, landmark information, etc.) and incorporates the game data received into the overall parallel reality game for all players of the parallel reality game. The universal game module 145 can also manage the delivery of game data to the client device 110 over the network 105. The universal game module 145 may also govern security aspects of client device 110 including but not limited to securing connections between the client device 110 and the game server 120, establishing connections between various client device 110, and verifying the location of the various client device 110.

The commercial game module 150, in embodiments where one is included, can be separate from or a part of the universal game module 145. The commercial game module 150 can manage the inclusion of various game features within the parallel reality game that are linked with a commercial activity in the real world. For instance, the commercial game module 150 can receive requests from external systems such as sponsors/advertisers, businesses, or other entities over the network 105 (via a network interface) to include game features linked with commercial activity in the parallel reality game. The commercial game module 150 can then arrange for the inclusion of these game features in the parallel reality game.

The game server 120 can further include a data collection module 155. The data collection module 155, in embodiments where one is included, can be separate from or a part of the universal game module 145. The data collection module 155 can manage the inclusion of various game features within the parallel reality game that are linked with a data collection activity in the real world. For instance, the data collection module 155 can modify game data stored in the game database 115 to include game features linked with data collection activity in the parallel reality game. The data collection module 155 can also analyze and data collected by players pursuant to the data collection activity and provide the data for access by various platforms.

The event module 160 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

The network 105 can be any type of communications network, such as a local area network (e.g. intranet), wide area network (e.g. Internet), or some combination thereof. The network can also include a direct connection between a client device 110 and the game server 120. In general, communication between the game server 120 and a client device 110 can be carried via a network interface using any type of wired or wireless connection, using a variety of communication protocols (e.g. TCP/IP, HTTP, SMTP, FTP), encodings or formats (e.g. HTML, XML, JSON), or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

In addition, in situations in which the systems and methods discussed herein access and analyze personal information about users (e.g., players), or make use of personal information, such as location information, the users may be provided with an opportunity to control whether programs or features collect the information and control whether or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user. Exemplary Augmented Reality System In various embodiments, augmented reality content can be provided by an augmented reality engine on a client device 110. For example, the augmented reality engine may execute on a smartphone, tablet, or wearable device (e.g., an AR goggles), or be distributed between a combination of such elements. The augmented reality engine may receive a stream of digital images produced by the camera assembly 125 of the client device 110. The digital images represent a near real-time view of the environment around the client device 110.

The augmented reality engine may also receive a geolocation position from a geolocation positioning system (e.g., positioning module 140). The augmented reality engine may use the geolocation position to identify and obtain (e.g., by downloading it from the server 120) 3D map data (e.g., a point cloud) for the environment around the client device 110. The augmented reality engine may perform localization to determine a more precise position of the client device 110 by comparing images captured by the camera assembly 125 of the client device 110 to the 3D map data. Using the determined position of the client device 110, the augmented reality engine may identify one or more augmented reality elements that have locations in the virtual world that correspond to real-world locations in the field of view of one or more cameras of the camera assembly 125. The augmented reality engine may cause the augmented reality elements to be displayed overlaid on images captured by the camera assembly 125.

Exemplary Wearable Augmented Reality Device

As described above, some or all of the functionality of the client device 110 may be provided by a wearable device. In one embodiment, the wearable device is AR goggles. Alternatively, the wearable device may have other form factors, such as a visor or glasses.

Figure 3:
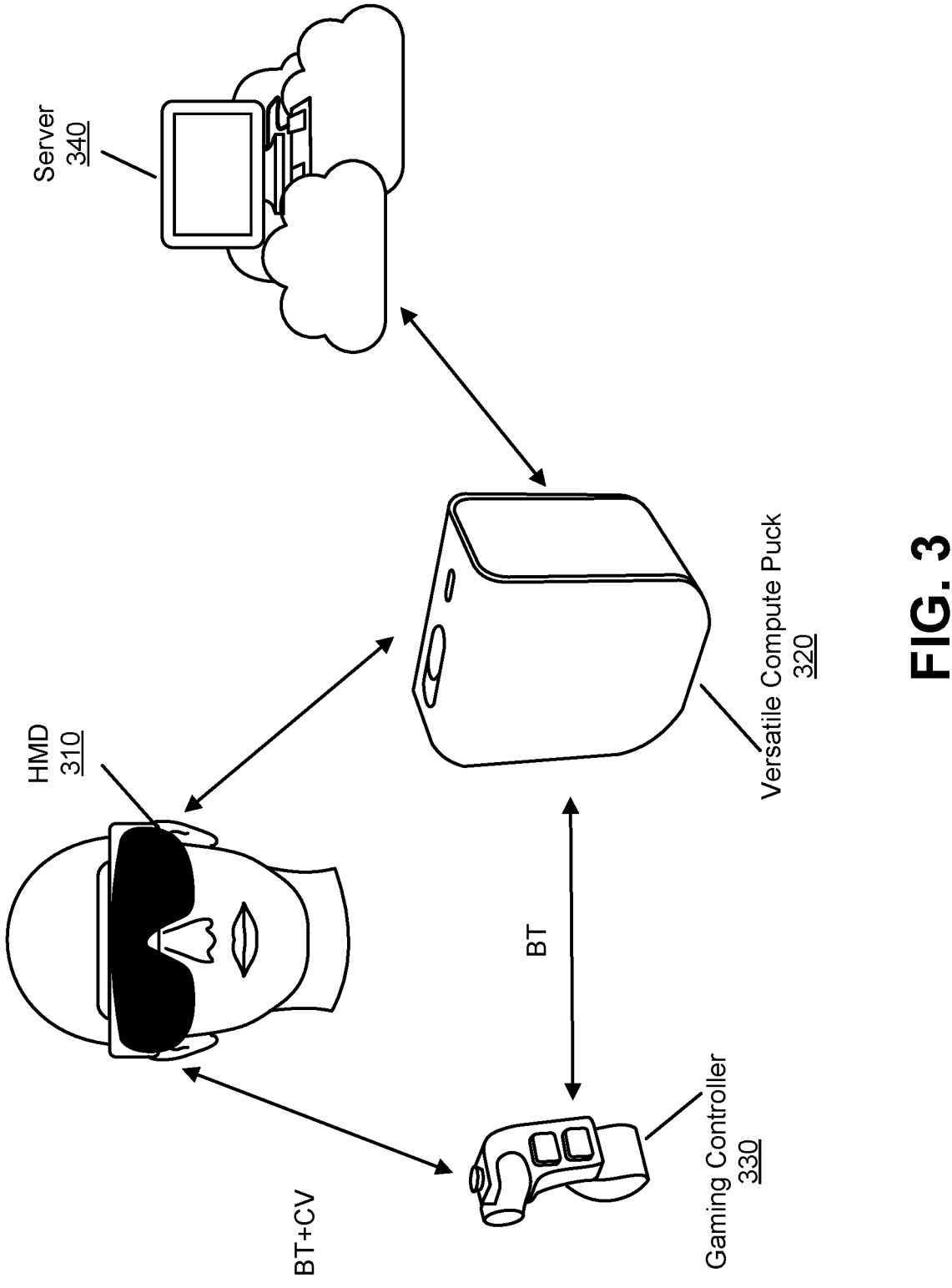
FIG. 3 is a system environment diagram including a compact augmented reality (AR) device, according to one embodiment.

FIG. 3 is a system environment diagram including a compact augmented reality (AR) device, according to one embodiment. The AR device may include a pair of AR goggles 310. The system environment includes the AR goggles 310 (e.g., head-mounted device or HMD), a versatile computing puck (VCP) 320, an outdoor gaming controller 330, and a server 340. The VCP 320 can take multiple form factors.

In some embodiments, the TIMID 310 is lightweight, small size, and equipped with low power, the VCP 320 may provide application support or development functionality to the HMD 310. In some embodiments, the VCP 320 may have more processing power, memory, and power storage than the TIMID 310 to support the provision of more services and software functionality. In one implementation, the VCP 320 may be carried or mounted on a vehicle, etc., rather than worn, there are less restrictions on size, weight, and shape. The VCP 320 offloads from the HMD components, such as cellular communication (5G), antennas, GPS, and battery. In some embodiments, the VCP 320 may offload one or more compute processes from the HMD 310, such as, content rendering in the application and communication with the backend. In this way, the VCP 320 may reduce the power consumption of the HMD 310.

The gaming controller 330 is a device configured to take user input and transmit the input to the AR goggles 310. For example, a user may use the gaming controller 330 to select an item that is being shown by the AR goggles 310 and interact with that item by pointing the gaming controller 330 at it. In some embodiments, the gaming controller 330 may be used outdoor.

The components in the system environment, e.g., HMD 310, the VCP 320, the game controller 330, and the server 340, may communicate via various communication technologies, such as, Bluetooth™, computer vision (CV), Wi-Fi, Near Field Communication (NFC), Internet of Things (IoT), satellite communications, etc., This and other aspects of the described embodiments may provide a socially acceptable and compact wearable product (e.g., AR goggles or an AR visor), that still provides a highly performant, high fidelity AR experience.

Figure 4A:
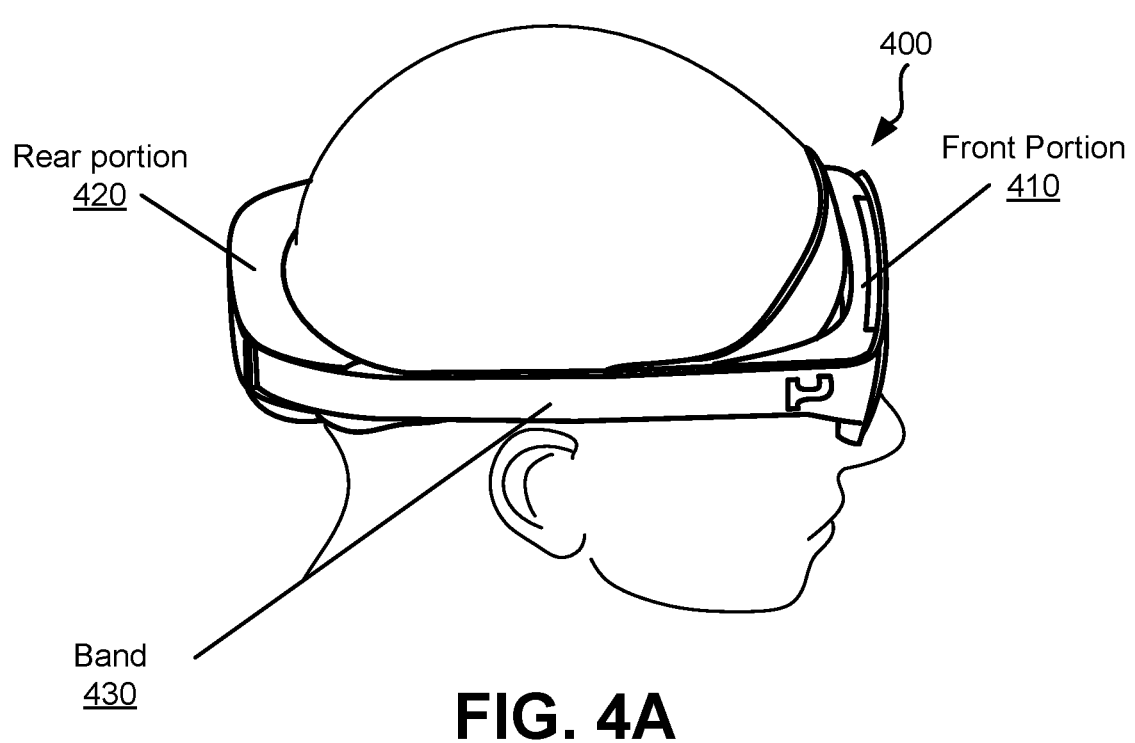
FIG. 4A illustrates a side view of the compact AR device, according to one embodiment.

FIG. 4A illustrates a side view of the compact AR device 400, according to one embodiment. The AR device 400 may include two portions: e.g., a front portion 410 and a rear portion 420. Each portion may enclose components, such as, sensors, cameras, batteries, optical displays, etc., for the AR device 400. The components are arranged in the two portions such that the AR device 400 is approximately balanced in weight. For example, the weight of the front portion 410 is approximately equal to the weight of the rear portion 420.

In one embodiment, the rear portion 420 includes one or more batteries and processing units. The processing units may include PCBs and antennas that allow the rear portion 420 to process data from the sensors of the front portion 410 and communicate with a game server or other external devices. In some embodiments the rear portion 420 may additionally house accelerometers and positioning units (e.g., a GPS unit) to enable the AR device 400 to determine its location and movement within the real world.

Figure 7:
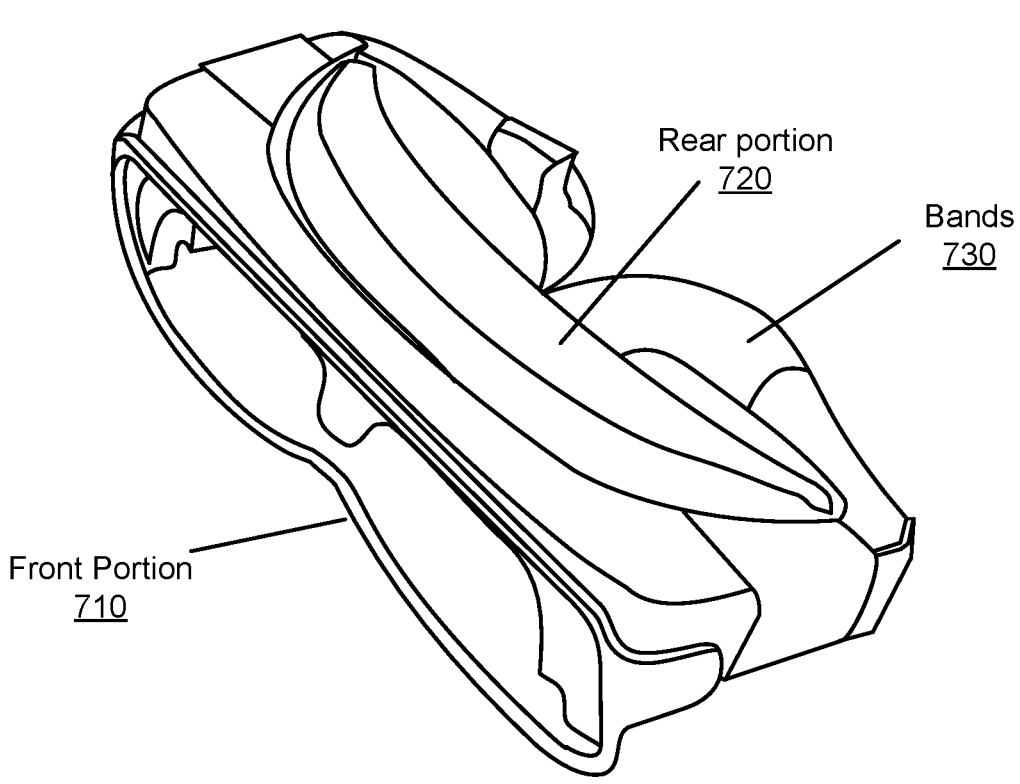
FIG. 7 illustrates an example AR device that is folded for storage, according to one embodiment.

In some embodiments, the rear portion 420 and front portion 410 are connected via one or more bands 430 that rest on either side of the user's head. For example, a left side band may connect to the front portion 410 near the user's left temple and connect to the rear portion 420 behind the user's left ear. In one embodiment, the bands 430 are made of a flexible and elastic material that allows for the AR device 400 to stretch to comfortably fit a variety of head sizes and shapes. The flexible bands 430 may additionally allow for the AR device 400 to be collapsible/foldable for compact storage as seen in FIG. 7.

Figure 4B:
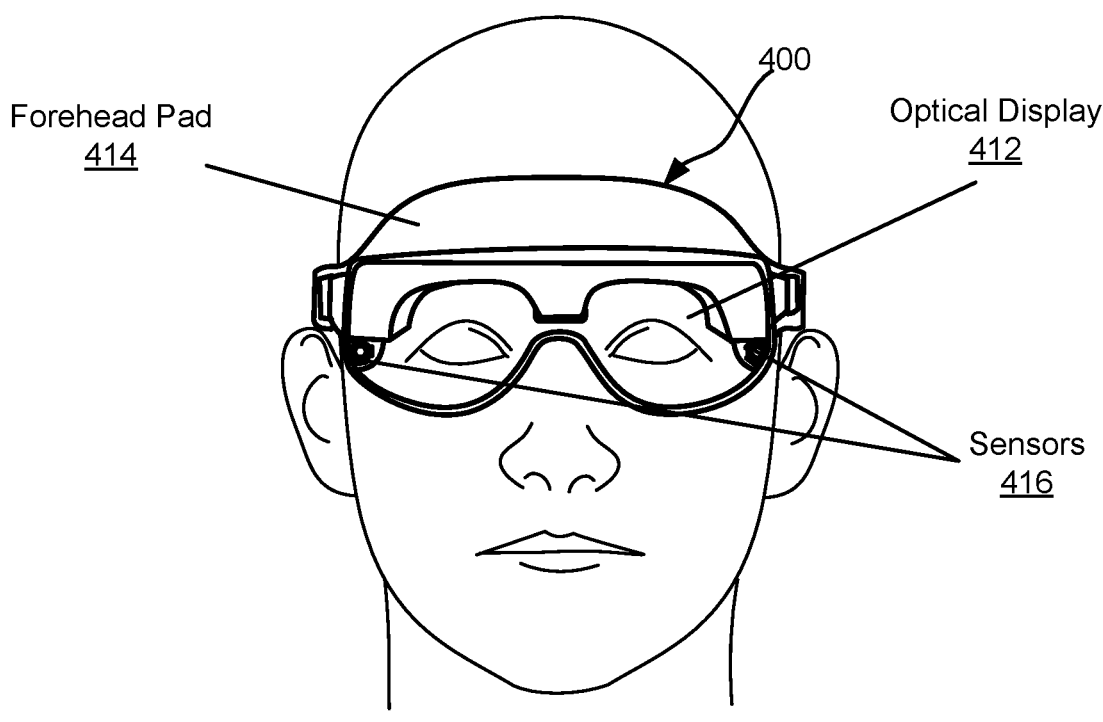
FIG. 4B illustrates a front view of the compact AR device, according to one embodiment.

FIG. 4B illustrates a front view of the compact AR device 400, according to one embodiment. In one embodiment, the front portion includes one or more optical displays 412, speakers, microphones, cameras, and additional sensors 416. In some embodiments, the number of components that are located in the front portion 410 is kept low to prevent excess heat from being near the user's eyes and face. However, this may be balanced with providing an approximately even weight distribution between the front and back of the AR device 400 (e.g., by placing heavier components that generate relatively low amounts of heat in the front portion 410 while placing components that generate more heat in the rear portion 420). The placement of the components of the front portion 410 may be determined by the width of the optical display(s) 412. For example, only components that can fit within the footprint of the optical display 412 may be included in the front portion 410 so that the front portion 410 does not expand past the width of the head of the user. This allows for the front portion 410 to have a small and socially acceptable footprint. For example, the size of the front portion 410 may be similar to a pair of sunglasses. The compact form of the front portion 410 allows for the AR device 400 to accommodate varying widths of the human head without relying on adjustments.

The optical displays 412 of the front portion 410 are positioned to be in front of the wearer's eyes. In one implementation, the optical displays 412 may emit image light to the eyes of the user to generate visuals for an augmented reality game. The optical displays 412 may be transparent to allow light from the environment of the AR device 400 to pass through the optical displays 412 such that the user can see the image light and the environment at the same time. In this way, a user may perceive augmented reality objects as being overlaid on the environment around them. Although FIG. 4B illustrates a single optical display 412, the AR device 400 may, in some embodiments, have a pair of optical displays 412 (e.g., disposed in front of each eye of the user).

In some embodiments, the AR device 400 may include a space between the optical display(s) 412 and a user's eyes.

The AR device 400 may include vision correction glasses or sunglasses that are fit into the space. In some embodiments, vision correction glasses or sunglasses may be incorporated into the AR goggles by being temporarily or permanently connected to the AR device 400 using one or more connectors. In some embodiments, the AR device 400 may include an interchangeable forehead pad 414.

In some embodiments, the AR device 400 may include shaded lenses that are incorporated with the AR goggles. For example, the AR device 400 may be used for outdoor gaming and may be preferable for the AR goggles to let a portion of the environmental light (e.g., sun light) through the lenses so that the user can still see the AR content provided by the optical displays 412. In one implementation, the shaded lenses are electronically adaptable (e.g., electrochromic) to change the level of shading dependent on environmental light conditions. For example, on a bright and sunny day, the shaded lens may allow 30% of the environmental light through, while on a cloudy day or at dusk the shaded lens may allow 60% of the environmental light through. In another implementation, the shaded lenses may be removable such that a user can swap out the lens for a preferred level of shading or remove it all together for indoor use of the AR device 400.

In one example, the AR device 400 may include electronic components including environmental sensors 416 such as cameras, sensors, and/or communication components (e.g., Bluetooth™, Wi-Fi, cellular, 5G, etc.), computing units (CPU, GPU), memory, and wiring etc. In another example, the environmental sensors 416 include cameras, depth sensors, and microphones. In some embodiments the speakers are positioned to be directly over the ears of the wearer. In another embodiment, the speakers are positioned on the front portion near the user's temples.

In some embodiments, the AR device 400 may include a set of antennas mounted in the AR device 400. The antennas allow better communication with cell tower antennas. It should be appreciated that any number of antennas may be mounted on the AR device 400, limited only by the size of the antennas and the available space on (and inside of) the AR device 400.

In some embodiments, the AR device 400 includes a socket for connecting the AR goggles to a separate device. The connector to auxiliary device may be a port for a cable attachment or permanently attached cable to connect a separate device to the AR goggles. In one embodiment this separate device is a mobile phone running an application that controls the AR goggles. For example, the wearer may connect the AR goggles to their mobile phone to enable images and sensor data captured by the AR goggles to be passed to the mobile phone for processing or for the mobile phone to provide AR data for displaying AR content on the optical displays 412. In another embodiment, the separate device is an external battery pack to power the AR goggles. In this embodiment the external battery may decrease the weight of the AR goggles by replacing the batteries of the goggles, or it may increase the battery life of the AR goggles by supplying an extra power source. In any embodiment, there may be one or more connectors to auxiliary devices such that the AR goggles may be connected to multiple devices at once. In one embodiment, the VCP or outdoor gaming controller are connected to the AR goggles via a cable plugged into the socket.

The AR device 400 may also include one or more batteries to provide power to the other components. Additionally, or alternatively, power may be provided through the connector from an auxiliary device. The batteries may be custom in shape to fit the rounded form of the back portion such as to lay flush to the back of the user's head.

The rear portion 420 of the AR device 400 may have an identifier such as a QR code or another visual encoder on its surface. The identifier may be used to identify devices in the same environment. For example, another compact AR device or client device may capture an image of the identifier on the AR device 400 and process the image to create an identity for the user wearing the AR device 400 in the image. In this way, devices interact in multiplayer game settings by identifying other players of the game nearby and establishing contact with them. In some embodiments, the connection between devices may further be established through message streams or sharing location between devices.

Figure 5B:
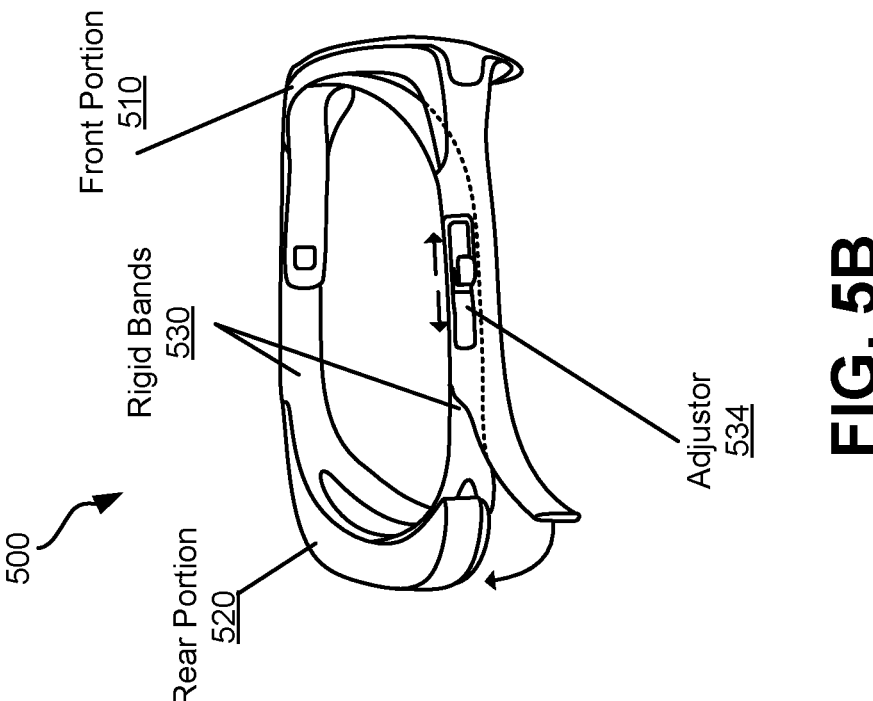
FIG. 5B illustrates an example AR device with non-flexible bands, according to one embodiment.
Figure 5A:
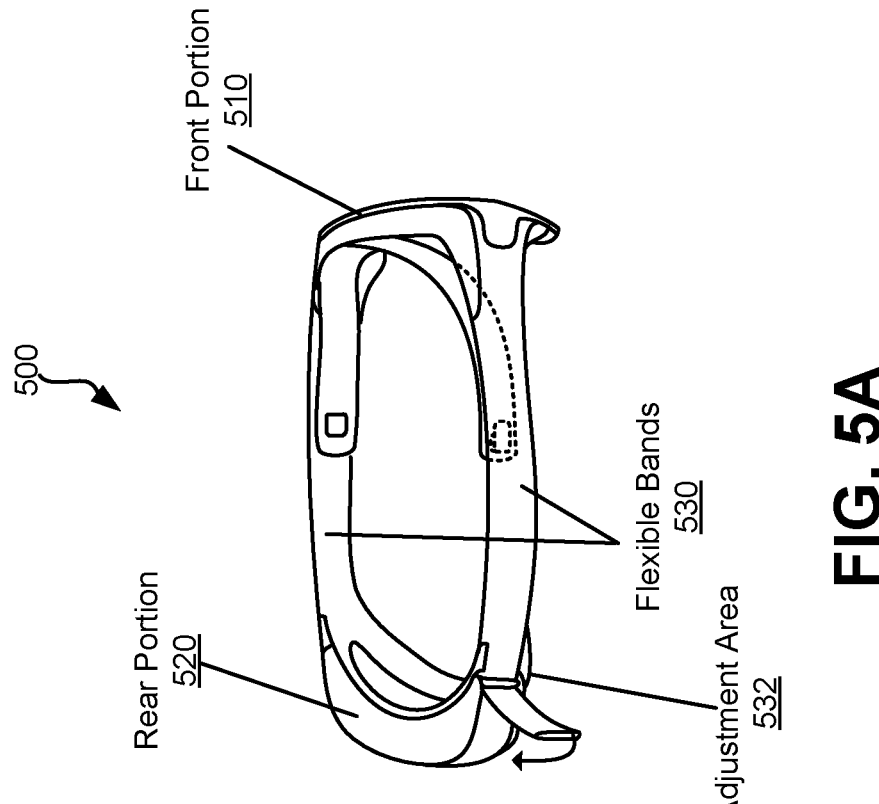
FIG. 5A illustrates an example AR device with flexible bands, according to one embodiment.

FIG. 5A illustrates an example AR device 500 with flexible bands, according to one embodiment. As shown in FIG. 5A, the front portion 510 and the rear portion 520 are connected by flexible bands 530. In some embodiments, the AR device 500 may also include an adjustment area 532 where the flexible bands 530 may be pulled through to increase or decrease their length.

FIG. 5B illustrates an example AR device 500 with non-flexible bands, according to one embodiment. As shown in FIG. 5A, the front portion 510 and the rear portion 520 are connected by non-flexible bands 530. In some embodiments, the AR device 500 includes an adjustor 534 that allows for the non-flexible bands 530 to slide to a desired length to fit the head of a user.

In some embodiments, the bands 530 (e.g., flexible or non-flexible) may house cables that electronically couple components in the front portion 510 to components in the rear portion 520. In some embodiments, the cables may be braided to allow the cables to safely bend and be manipulated. In some embodiments, 30-50 cables (e.g., coaxial cables) may run through each band 530 to connect the front and rear components while keeping heat dissipation at a minimal level. In some embodiments, the bands 530 may be customizable for aesthetic value. For example, the bands 530 may be interchangeable so that a user can switch out the color or pattern of the bands 530 based on their aesthetic preference.

Figure 6:
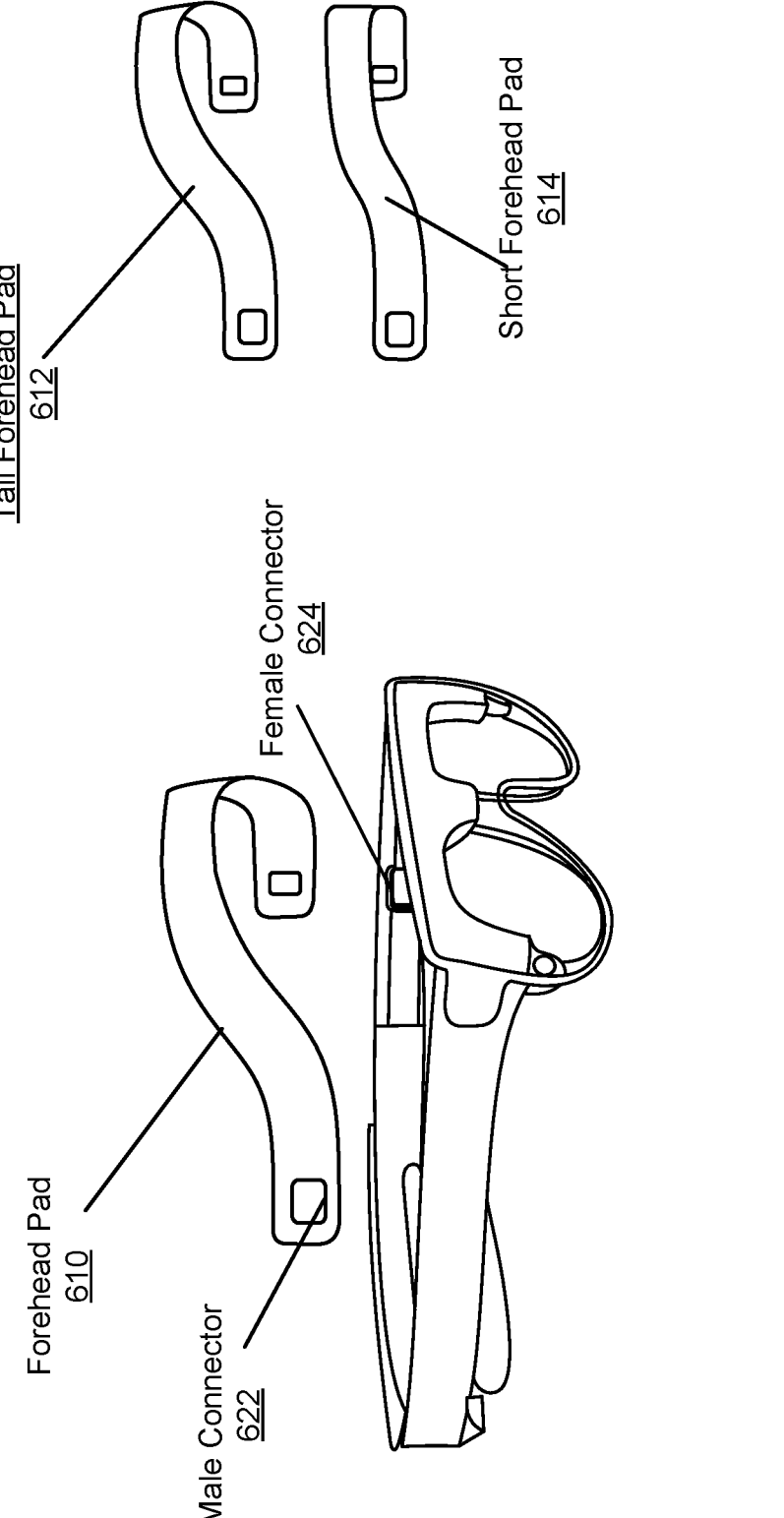
FIG. 6 illustrates an example AR device with an interchangeable forehead pad, according to one embodiment.

FIG. 6 illustrates an example AR device 600 with an interchangeable forehead pad, according to one embodiment. As shown in FIG. 6, the AR device 600 may include a forehead pad 610 for providing stability and comfortability of the device. For example, the forehead pad 610 may distribute the weight of the front portion components across the forehead of the user, rather than the AR goggles resting primarily on the nose bridge or check bones of the user. To accommodate differing head shapes, the forehead pad 610 may be interchangeable and customizable to a certain shape to fit a user. FIG. 6 shows two example embodiments of the forehead pad 610 in which one embodiment is tall (e.g., tall forehead pad 612) and the other is short (e.g., short forehead pad 614). Additional customizations of the forehead pad 610 are possible. For example, a forehead pad 610 may vary in width to otherwise accommodate user preferences. In some embodiments the material of the forehead pad 610 may be customizable. For example, the forehead pad 610 may be plastic but be customizable with a terry cloth cover to act as a sweat band. In some embodiments, the forehead pad 610 couples to the AR goggles by way of a pair of connectors. In one embodiment, the forehead pad 610 has a male connector 622 that fits into a female connector 624 on each side of the AR goggles. In some embodiments, the AR device 600 may include additional connections. In some embodiments, the forehead pad 610 may be swappable with visor forms that have a shading brim that extends forward past the optical displays to give the AR device 600 a visor form factor.

FIG. 7 illustrates an example AR device 700 that is folded for storage, according to one embodiment. As shown in FIG. 7, the AR device 700 has flexible side bands 730, and the AR device 700 can be folded/collapsed for compact storage when not in use. The flexible sides allow for the rear portion 720 to meet with the front portion 710. In some embodiments, the collapsed AR device 700 may be shaped to fit into a conventional sunglasses case for ease of transportation. In the shown embodiment, the rear portion 720 is curved to fit closely with the surface of the front portion 710 that rests on the user's forehead.

Figure 8:
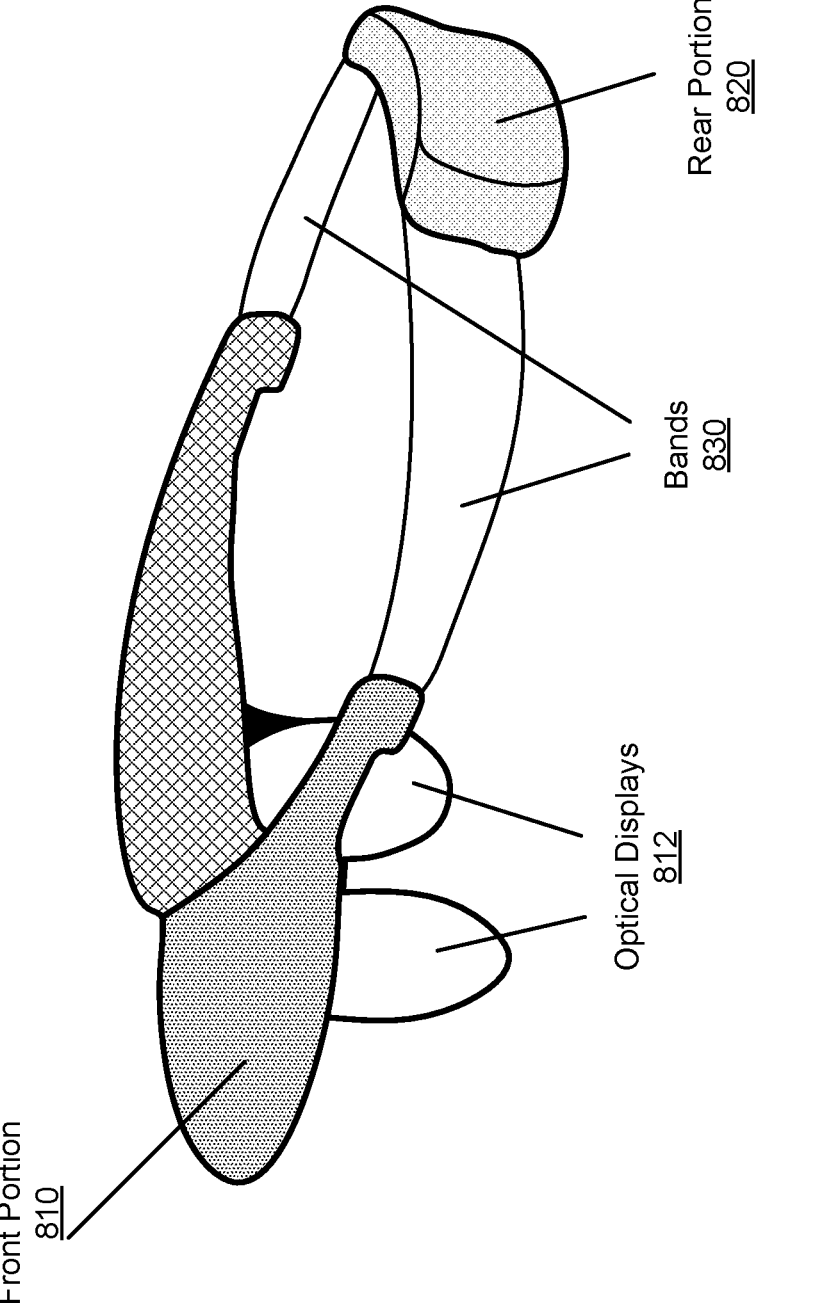
FIG. 8 illustrates an example AR device having a visor form factor, according to one embodiment.

FIG. 8 illustrates an example AR device 800 having a visor form factor, according to one embodiment. As shown in FIG. 8, the AR device 800 includes a front portion 810, a rear portion 820, and bands 830 that connect the two portions. The front portion 810 of the AR device 800 includes a visor brim rather than the goggles form factor shown in FIGS. 4-7. In some embodiments, the visor brim may be used as a heat sink and allow for more components to be located in the front portion 810 such that the rear portion 820 can be smaller or have more space for a larger battery.

Example Computing Device Architecture

Figure 9:
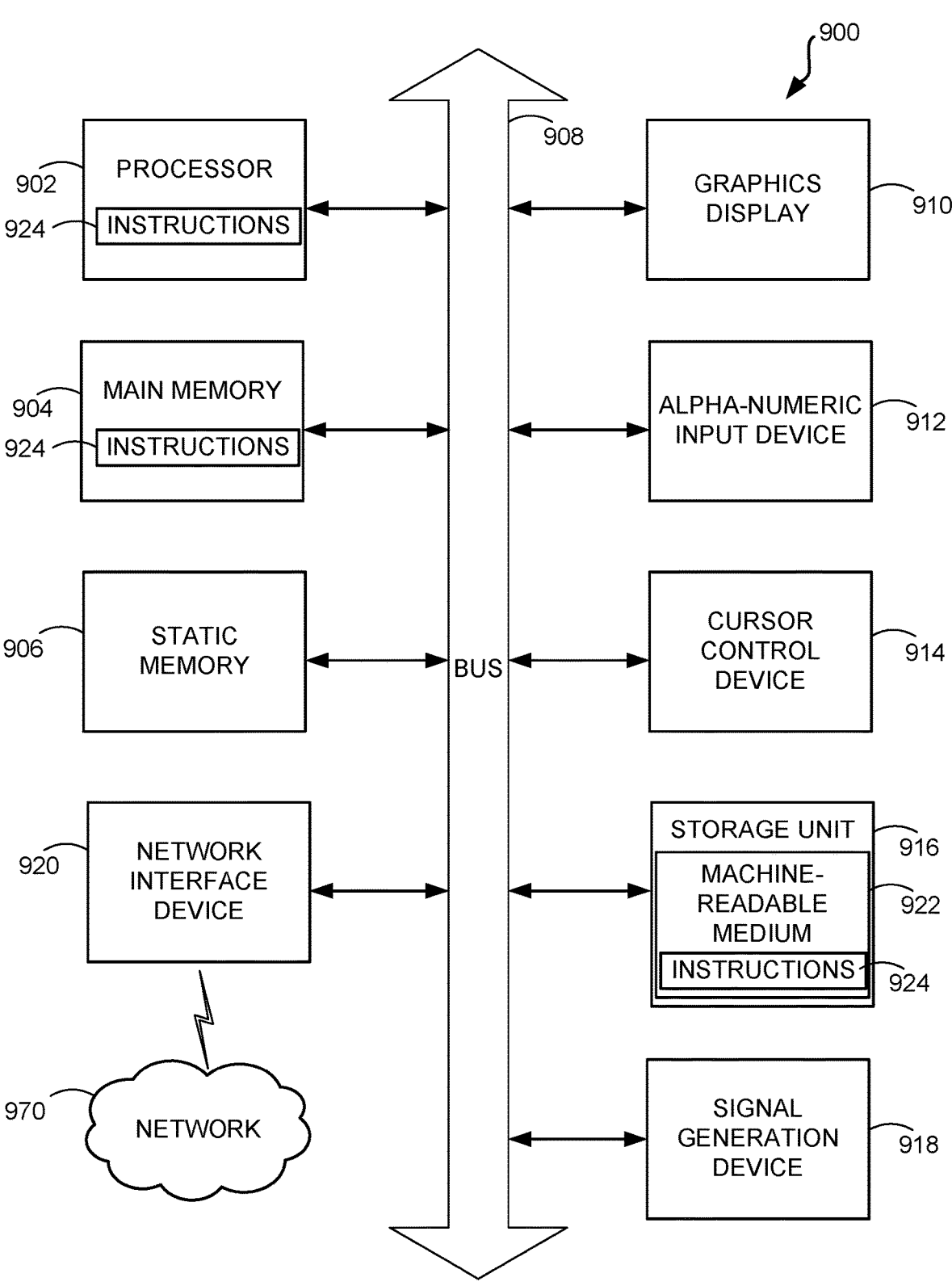
FIG. 9 is a block diagram illustrating components of an example machine able to read instructions from a machine-readable medium and execute them in a processor, according to one embodiment.

FIG. 9 is a block diagram illustrating components of an example machine able to read instructions from a machine-readable medium and execute them in a processor (or controller). Specifically, FIG. 9 shows a diagrammatic representation of a machine in the example form of a computer system 900. The computer system 900 can be used to execute instructions 924 (e.g., program code or software) for causing the machine to perform any one or more of the methodologies (or processes) described herein, including those associated, and described, with the components (or modules) of a game server 110 or client device 110.

The machine may be a server computer, a client computer, a personal computer (PC), a tablet PC, a set-top box (STB), a smartphone, a network router, switch or bridge, a cell phone tower, or any machine capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes one or more processing units (generally one or more processors 902). The processor 902 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. Any reference herein to a processor 902 may refer to a single processor or multiple processors. The computer system 900 also includes a main memory 904. The computer system may include a storage unit 916. The processor 902, memory 904, and the storage unit 916 communicate via a bus 908.

In addition, the computer system 900 can include a static memory 906, a display driver 910 (e.g., to drive a plasma display panel (PDP), a liquid crystal display (LCD), or a projector). The computer system 900 may also include alphanumeric input device 914 (e.g., a keyboard), a cursor control device 914 (e.g., a mouse, a trackball, a joystick, a motion sensor, or other pointing instrument), a signal generation device 918 (e.g., a speaker), and a network interface device 920, which also are configured to communicate via the bus 908.

The storage unit 916 includes a machine-readable medium 922 on which is stored instructions 924 (e.g., software) embodying any one or more of the methodologies or functions described herein. The instructions 924 may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 may be transmitted or received over a network 970 (e.g., network 105) via the network interface device 920.

While machine-readable medium 922 is shown in an example embodiment to be a single medium, the term "machine-readable medium" should be taken to include a single medium or multiple media (e.g., a centralized or distributed database, or associated caches and servers) able to store the instructions 924. The term "machine-readable medium" shall also be taken to include any medium that is capable of storing instructions 924 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate+/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

While the present subject matter has been described in detail with respect to specific exemplary embodiments and methods thereof it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations or additions to the present subject matter as would be readily apparent to one of ordinary skill in the art.

What is claimed is:

1. A head-mounted device (HMD) comprising:
a front portion comprising an optical display configured to output image light to an eye of a user;
a rear portion arranged with the front portion to balance the HMD in weight, the rear portion configured to rest against a back a of head of the user;
a first band connecting a left side of the front portion and a left side of the rear portion, the first band having a first inner surface configured to rest against a left side of the head of the user;
a second band connecting a right side of the front portion and a right side of the rear portion, the second band having a second inner surface configured to rest against a right side of the head of the user; and
a forehead pad configured to distribute at least some weight of the front portion over at least some of a forehead of the user, the forehead pad having a left end connected to the first inner surface and a right end connected to the second inner surface.

2. The HMD of claim 1, wherein the front portion further comprises one or more of speakers, microphones, cameras, or sensors.

3. The HMD of claim 1, wherein the rear portion comprises one or more batteries or processing units.

4. The HMD of claim 1, wherein the optical display is transparent to allow light from an environment of the HMD to pass through the optical display such that the user sees the image light and the environment at the same time.

5. The HMD of claim 1, further comprising: one or more vision correction glasses or sunglasses incorporated into the HMD.

6. The HMD of claim 1, wherein the rear portion includes an identifier for identifying the HMD to establish a connection with a second HMD.

7. The HMD of claim 1, wherein at least one of the first band or the second band houses cables that electronically couple the front portion and the rear portion.

8. The HMD of claim 1, wherein the forehead pad is connected to the first band and the second band by detachable connectors enabling the forehead pad to be interchangeable.

9. The HMD of claim 8, wherein the forehead pad is selected from a group comprising a short forehead pad configured to rest against a low portion of the forehead of the user and a tall forehead pad configured to rest against a high portion of the forehead of the user.

10. The HMD of claim 1, wherein the HMD is foldable.

11. The HMD of claim 1, wherein the optical display outputs image light to generate visuals for an augmented reality (AR) game.

12. A gaming device comprising:
a head-mounted device (HMD) comprising:
a front portion comprising an optical display configured to output image light to an eye of a user;
a rear portion arranged with the front portion to balance the HMD in weight, the rear portion configured to rest against a back of a head of the user;
a first band connecting a left side of the front portion and a left side of the rear portion, the first band having a first inner surface configured to rest against a left side of the head of the user;
a second band connecting a right side of the front portion and a right side of the rear portion, the second band having a second inner surface configured to rest against a right side of the head of the user; and
a forehead pad configured to distribute at least some weight of the front portion over at least some of a forehead of the user, the forehead pad having a left end connected to the first inner surface and a right end connected to the second inner surface; and
a gaming controller configured to receive input from the user and transmit the input to the HMD.

13. The gaming device of claim 12, wherein the front portion further comprises one or more of speakers, microphones, cameras, and sensors.

14. The gaming device of claim 12, wherein the rear portion comprise one or more of batteries and processing units.

15. The gaming device of claim 12, wherein the optical display is transparent to allow light from an environment of the HMD to pass through the optical display such that the user sees the image light and the environment at the same time.

16. The gaming device of claim 12, wherein the HMD further comprises: one or more vision correction glasses or sunglasses incorporated into the HMD.

17. The gaming device of claim 12, wherein the rear portion includes an identifier for identifying the HMD to establish a connection with a second HMD.

18. The gaming device of claim 12, wherein at least one of the first band or the second band houses cables that electronically couple the front portion and the rear portion.

19. The gaming device of claim 12, wherein the forehead pad is connected to the first band and the second band by detachable connectors enabling the forehead pad to be interchangeable.

20. The gaming device of claim 12, further comprising a versatile computing puck (VCP) providing power, memory, and power storage for the HMD.

* * * * *